UNITED STATES PATENT OFFICE.

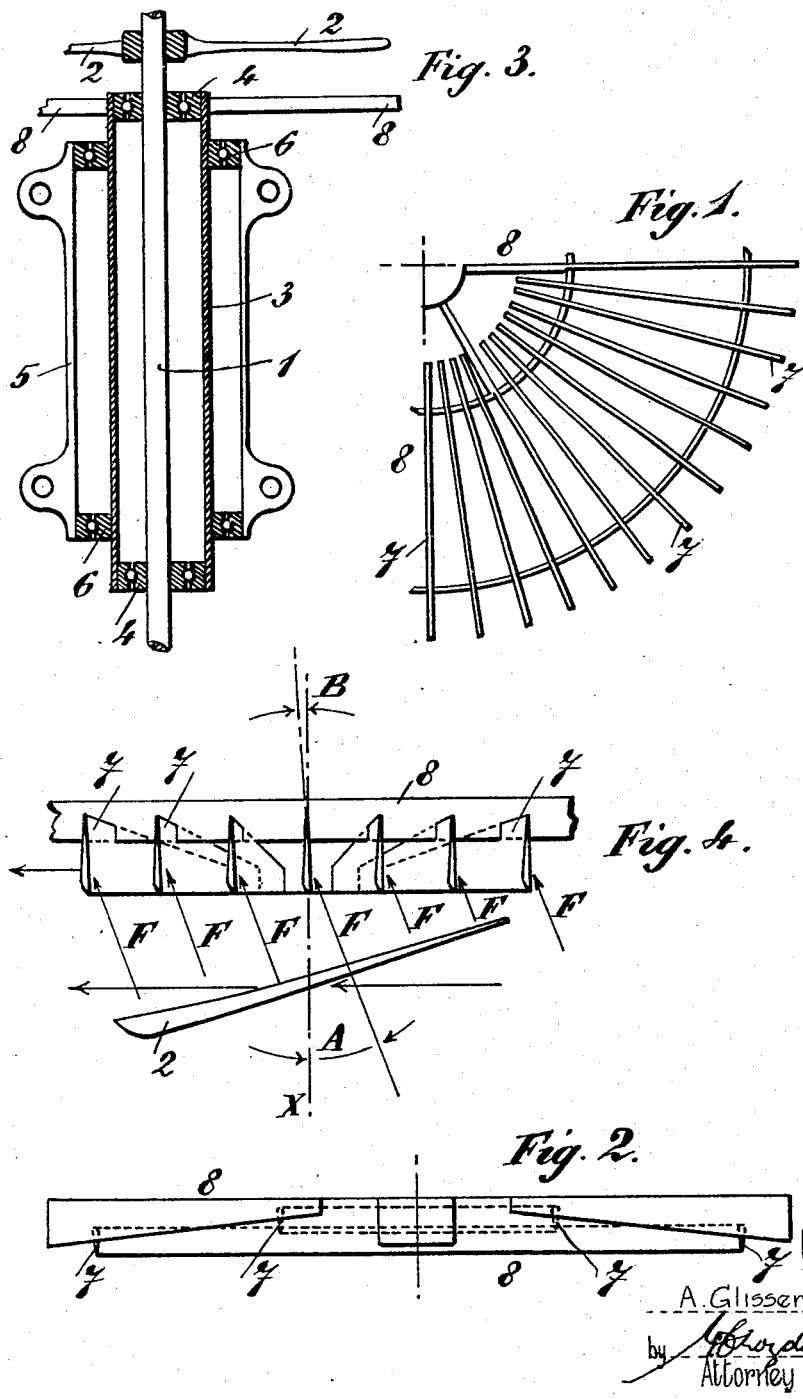

ANGELO GLISSENTI, OF BRESCIA, ITALY.

DEVICE FOR INCREASING THE OUTPUT OF SCREW-PROPELLERS.

1,220,327.     Specification of Letters Patent.     Patented Mar. 27, 1917.

Application filed January 12, 1916. Serial No. 71,640.

*To all whom it may concern:*

Be it known that I, ANGELO GLISSENTI, a subject of the Kingdom of Italy, and residing at 7 Via S. Martino, Brescia, Italy, have invented a certain new and useful Improvement in Devices for Increasing the Output of Screw-Propellers, of which the following is a specification.

The object of my invention is a vane or paddle wheel combined with a screw propeller in order to utilize the movement of the air caused by the said propeller to drive said paddle wheel, the movement of the latter being in its turn utilized to increase the output of power.

In the annexed drawing is represented by way of example a form of construction of the device forming the object of the present invention.

Figure 1 represents an elevational view of the device.

Fig. 2 represents an edge view of the wheel showing two vanes only.

Fig. 3 represents a horizontal cross section of the device through the hub of same.

Fig. 4 represents a diagrammatic plan view illustrating the action of the device.

Similar reference letters designate like parts throughout the several figures.

The complete arrangement of the device comprises a principal shaft 1 carrying the main screw-propeller 2.

Co-axial with said shaft is mounted a hollow shaft 3, intermediate ball bearings 4 being provided between the two shafts. The system of the two shafts 1 and 3 is supported by a hub 5 and the intermediate ball bearings 6, said hub being rigidly connected to a fixed part of the machine or device to which the invention is applied.

The hollow shaft 3 carries rigidly fixed thereto a vane or paddle wheel 8 situated behind the driving propeller 2 comprising a number of vanes 7 radiating from an axis and held in position by the two rings shown.

The operation of the device is as follows:—

The body of air emerging from the driving screw propeller has a helicoidal movement in the direction of the arrows F which may be considered as being set up by two forces, one a translational force parallel to the axis and the other a rotary force perpendicular to the said axis.

The object of the invention is to utilize said rotary force which would otherwise be lost.

The formation of the vanes of wheel 8 is such that the impact surface is slightly inclined to the central axis $x$ by an amount corresponding to the angle B.

The helicoidal velocity of the air which makes, according to the pitch of the main propeller, an angle A with the direction $x$ of the axis, and the rotary component of which strikes the vanes of the wheel 8 rotates it in the same direction as the propeller.

The motion so caused may be utilized either for adding force, through suitable transmission gear, to that given by the screw-propeller, or to drive any other machine or device accommodated in the proximity of the system.

Having now particularly described my invention what I claim as new and desire to secure by Letters Patent is:—

A main propeller, mounted on a revolving shaft, a hollow shaft rotatably mounted on said shaft, a hub supporting both said shafts, and a paddle-wheel mounted on the said hollow shaft in front or behind said main screw propeller, to be set in movement by the jets of air caused by the rotation of said main screw propeller.

In testimony whereof I affix my signature in presence of two witnesses.

ANGELO GLISSENTI.

Witnesses:
 GIAN GIACOMO GUARNIERI,
 L. R. ARROYS.

Copies of this patent may be obtained for five cents each, by addressing the "Commissioner of Patents, Washington, D. C."